(12) United States Patent
Gale et al.

(10) Patent No.: US 8,108,246 B2
(45) Date of Patent: Jan. 31, 2012

(54) SYSTEM AND METHOD FOR PRICING A PRODUCT

(75) Inventors: Bradley T. Gale, Chatham, MA (US); Donald J. Swire, Auburndale, MA (US)

(73) Assignee: Customer Value, Inc., Naples, FL (US)

( * ) Notice: Subject to any disclaimer, the term of this patent is extended or adjusted under 35 U.S.C. 154(b) by 755 days.

(21) Appl. No.: 12/288,366

(22) Filed: Oct. 20, 2008

(65) Prior Publication Data
US 2009/0119231 A1 May 7, 2009

Related U.S. Application Data

(60) Provisional application No. 60/999,925, filed on Oct. 22, 2007.

(51) Int. Cl.
*G06Q 10/00* (2006.01)
*G06Q 30/00* (2006.01)
*G06F 17/00* (2006.01)
*G06G 7/00* (2006.01)

(52) U.S. Cl. .............................. 705/7.35; 705/400

(58) Field of Classification Search .................... None
See application file for complete search history.

(56) References Cited

U.S. PATENT DOCUMENTS

| 2004/0107131 A1* | 6/2004 | Wilkerson et al. | 705/10 |
| 2004/0230464 A1* | 11/2004 | Bliss et al. | 705/7 |
| 2005/0131770 A1* | 6/2005 | Agrawal | 705/26 |
| 2005/0256778 A1* | 11/2005 | Boyd et al. | 705/26 |

OTHER PUBLICATIONS

Anderson et al., "Customer Value Assessment in Business Markets: A state-of-Practice Study", ISBM Report, Oct. 1993.*

* cited by examiner

*Primary Examiner* — John Hayes
*Assistant Examiner* — George Chen
(74) *Attorney, Agent, or Firm* — Ralph D. Gelling

(57) ABSTRACT

A system, method, and program product is described that is constructed to establish a database of market information, relating to a target product and its competitors in the market. The database is processed to allow the user to establish a price for the target process based on customer perceived value and to display the processed information in several useful charts and tables for product value comparison, appraisal, and pricing.

24 Claims, 8 Drawing Sheets

Standard Input Form (Input CR Air Cleaners 02 Dust)

Options:
Market Segment: Air Cleaners
Data source: CR Feb. 02
Analyst: ABC
Date: 10/26/02
P-V Slope:
Currency: $

Suppliers: (Make of 1 benefit point. Program will suggest a value if this is left blank.)

| Dimension Attribute (Optional) | Percent Weight | Acme Score | Baker Score | Cincinatti Score | Dart Score | Envoy Score | Fargo Score |
|---|---|---|---|---|---|---|---|
| Dust | 40.0 | 9.0 | 8.0 | 7.0 | 3.0 | 3.0 | 3.0 |
| Smoke | 30.0 | 7.0 | 7.0 | 6.0 | 3.0 | 3.0 | 3.0 |
| Noise | 20.0 | 6.0 | 6.0 | 4.0 | 6.0 | 7.0 | 6.0 |
| Ease of use | 10.0 | 6.0 | 6.0 | 6.0 | 6.0 | 6.0 | 8.0 |
| Sum of weights | 100.0 | | | | | | |
| Benefit Score | | 418 | 250 | 160 | 120 | 130 |

Prices:

| | Acme | Baker | Cincinatti | Dart | Envoy | Fargo |
|---|---|---|---|---|---|---|
| Equipment Price | 100.0 | | | | | |
| 2 year Energy | 100 | 110 | 126 | 84 | 48 | 106 |
| 2 year Filter | 100 | 144 | 264 | 200 | 120 | 250 |

Figure 2

SYSTEM AND METHOD FOR PRICING A PRODUCT

RELATED APPLICATIONS

This application claims priority from Provisional Application for Patent No. 60/999,925, filed Oct. 22, 2007

BACKGROUND

1. Field

The disclosed embodiments generally relate to a system and method for establishing a market price for a product, and in particular a system and method for determining price based on value to the consumer.

2. Brief Description of Related Developments

Customer perceived value has become a popular basis for marketing analysis and strategy. The concepts of customer perceived value are described in *Managing Customer Value*, by Bradley T. Gale, The Free Press, 1994. It is advantageous to extend these concepts and apply them to a method and system for determining a competitive price position for a target product.

Two widely used approaches to measuring the differences in worth among competing products are cost-in-use analysis and importance-performance analysis. It is a purpose of the system and method of this application to combine and extend certain aspects of these traditional approaches to provide a system for measuring and analyzing the differences in worth/value among competing products while accounting for customer perceived value. It is a further purpose of the system and method of this application to apply the result to obtain a price for a product which strategically reflects its value to the purchaser relative to other products in the market.

SUMMARY

In one embodiment of the method of this application, product A is selected for pricing analysis. A list of the different products that compete in the market with product A is compiled and stored in a product database with the current price for each product. A list is then generated, from marketing data, of the factors that a consumer considers in selecting which product, among the competing products, to buy. According to the method and system of this application, the factors: price, performance attributes, and cost of use benefits are combined and analyzed to achieve the result. The performance attributes and cost of use benefits are each weighted according to their significance in influencing the purchase decision. Each product is then rated with respect to its performance for each of the established performance attributes and cost benefits. Cost of ownership or cost of use benefits data are obtained for each product and include items such as energy costs, fuel consumption, service and maintenance history, efficiency, product life and other similar items.

In a first step in processing the data, an overall weighted performance score is established for each product using the product's average performance over the array of attributes, weighted according to the significance assigned to each attribute. A cost to the purchaser is then calculated, i.e. purchase price, plus cost of use benefits. These data is entered, organized and stored in a spread-sheet style application for display as a table and for further processing. The data may be entered in a data input form for each product and then compiled for presentation as a chart on a computer display for convenient observation of all of the data for a product group.

The resulting data is processed to generate graphic representations of the data for display. One graphic display is a plot of cost to the consumer versus the overall weighted performance score for each product. This display is referred to herein as the "Value Map" and extends the basic concept, as described in the above referenced book by Dr. Gale, to obtain monetary values for an increment of performance by a product relating to an attribute. To accomplish this, a Fair-Value Line is established that represents the relationship between cost to the customer and performance. Generally the Fair-Value Line passes through points on the Value Map representing the average performance for the product group and the group average cost.

In another aspect of the embodiments of this application, a monetary coefficient is calculated that represents the worth associated with an incremental improvement in product performance for a particular attribute. This may be calculated as the slope of the Fair-Value line times the relative importance weight factor of the attribute.

In another aspect of the embodiments of this application, a reference is established as a baseline for estimating the value of Product A. According to this embodiment, the reference would be defined by the average price, average performance scores on each attribute, and average cost of use benefit. Target product A may then be compared to the reference with respect to performance scores, attribute by attribute, and then, using the monetary coefficient, a monetary value may be obtained for the differences in performances observed. This monetary value represents the monetary coefficient multiplied by the difference in each score between product A and the reference product. With respect to cost of use, the differences between the cost of using the target product A and the reference may be directly calculated. The results of this analysis may be presented in a second display image in tabular form called the Product-Appraisal Table and includes the totals in monetary value of price, performance attributes, and cost of use benefits.

In another aspect of the embodiments of this application, the data of the Product-Appraisal Table is combined with the price of the reference, the production cost of product A, the monetary value of the attributes for product A, the cost of use benefits, a desired profit margin or trial price, to obtain a third graphic display referred to as the Value-Pricing Chart. An appraisal for product A is established by starting with the price of the reference and adding the net worth of the monetary value of the performance attributes, for example, the monetary value of the above average attributes for product A and the cost of use benefits. This establishes a worth to the consumer for Product A. If the value established in this manner is used as a reference, a suitable price for product A may be determined by further analysis of production cost, margin, and other competitive factors.

In another aspect of the embodiments of this application, differential costs of using or owning the different products can be displayed on the value map as modifying either the price-axis positioning or the performance-axis positioning of a product.

For example, say car model A is expected to consume $2000 of gasoline over a typically expected period of ownership, while model B is expected to use $1000 worth. One strategy for incorporating this information on the value map is to add the gasoline costs onto the cars' purchase prices and plot the resulting total cost of ownership on the price axis. This is useful for comparing different models to see which car is, in the long run, the better deal. It is not so useful, however, for the automaker who is using this display to set a price. This is because the gasoline component of the total cost as calculated in this manner is not under the control of the auto maker.

An alternative strategy for incorporating this information is to plot just the cars' purchase prices on the price axis, but to modify the performance-axis positioning of the different products to reflect the different costs of using the product. In the above example, all other things being equal, we could say that car model B has better performance than car model A since it uses less gasoline. To reflect this fact on the value map, the horizontal (performance dimension) positioning of the two models can be adjusted. In the above example, the position of car model A would be adjusted to the left (worse performance) while the positioning of car model B would be adjusted to the right (better performance.) Arithmetically, we would adjust the performance index of each product by the amount by which the costs of using that product beat the costs of using the average product, divided by the slope of the fair-value line.

In another aspect of the embodiments of this application, the product plots may be represented by circles or bubbles. Traditionally, scatter plots, such as a Value Map have their subjects (products) plotted as dots on the chart. By using bubble plots, further information may be represented, for example, when a Value Map is plotted using bubbles, the bubble sizes typically represent the sales of the products. Larger bubbles thereby identify products with larger market shares. In this embodiment, nested bubbles are used, i.e circles within circles. By adapting each bubble within a bubble, to represents sales at a different point in time, historic or chronological data can be added to the display.

In another aspect of the embodiments of this application, the Value Map and the Value-Pricing Chart are presented as adjacent parts of a single display referred to as the Pricing Simulator. The display drivers for the adjacent map and chart are adapted to cooperate so that modification of, for example, the price of a product under consideration in the Value Pricing Chart results in a corresponding change in the price in the Value Map. In this manner, different strategies may be explored with instantaneously viewable results. Another factor that is advantageous to adjust would be the slope of the Fair-Value Line. For convenient adjustment of these factors in this embodiment, image controls are presented on the display that are adapted to be moved, for example, by cursor engagement. Movement of the control up or down or from left to right, changes the positioning of the target product's price or the slope of the Fair-Value Line up or down on the charts in parallel.

To accomplish the embodiments described above, a computer system is provided comprising a processor into which data may be entered by means of a user interface, such as a keyboard. The processor operates in cooperation with memory in which a database is established by entering: a listing of products within a competing group of products in a particular market; a listing of product attributes that influence a purchase decision; current prices for the listed products; a weighting factor for each attribute indicative of the relative influence of the attributes; a performance score for each product with respect to each attribute; and an identification of the relative costs or benefits resulting from the use of each product.

A spread sheet or other database manipulating application program is associated with the processor to provide the frame work for processing and organizing the database. A display is provided to present image screens according to instructions from display drivers in response to commands from the application program. The application program is adapted to compile elements of the data and calculate certain key factors, such as overall performance scores, average performance scores, total cost, in order to generate: a Value Map; a Product Appraisal Table; and a Value Pricing Chart.

In another aspect of the embodiments of this application, a database program, having the capability of manipulating data and making calculations based on the data, is adapted to, using: a listing of the products under consideration; an identification of the attributes that influence a purchase decision; a weighting factor indicative of the influence of each attributes; a performance score on each attribute for each product; current purchase prices for each product; and cost and benefit data for each of the products; calculate:
  an overall performance score for each product;
  the total cost to the customer (purchase price plus other costs or benefits) for each product;
  and generate:
  a scatter plot of total cost to the customer versus overall performance (a "Value Map");
  a "Fair-Value Line" capturing the relationship between cost to the customer and performance;
  calculate the monetization coefficients, i.e., the worth associated with a one-point improvement in the performance score on each individual attribute;
  select a reference product (typically, the "average product", which has category-average scores on each attribute and category-average price). The price of the reference product is used as a baseline for estimating the worth of the business's product;
  compare the performance scores of the target product (product A) against the reference product, attribute by attribute, and assigning a monetary value to any differences. The monetary value is the worth of a one-point improvement (calculated in step 5) multiplied by the difference in scores between the business and the reference business;
  estimate the worth of the target product A. This is calculated as the price of the reference product, plus the net monetary value of any performance differences, plus the net value of any savings in the costs of use or ownership; and
  using the worth/value estimated, select a price for the target product A for strategically positioning product A in the market.

In another embodiment of the program, the program is adapted to generate a Value Appraisal Table and a Value-Pricing Chart.

In another aspect of the program, the program is adapted to generate a Value Map using nested bubbles to identify market share by the size of the bubble and historic market share by bubbles within bubbles.

In another aspect of the program, the program is adapted to generate a Price Simulator display that combines the presentation of data in a Value Pricing Chart and a Value Map, positioned next to each other, in which product price and the Fair-Value Line may be adjusted by the manipulation of a control image.

BRIEF DESCRIPTION OF THE DRAWINGS

The above aspects and other features of the embodiments are explained in the following description, with reference to the accompanying drawings, wherein:

FIG. 2 shows an example of a data input form that may be used in disclosed embodiments;

FIG. 9 is a flow diagram of an embodiment of the method of this application.

DETAILED DESCRIPTION OF THE EMBODIMENTS

Figure 1:
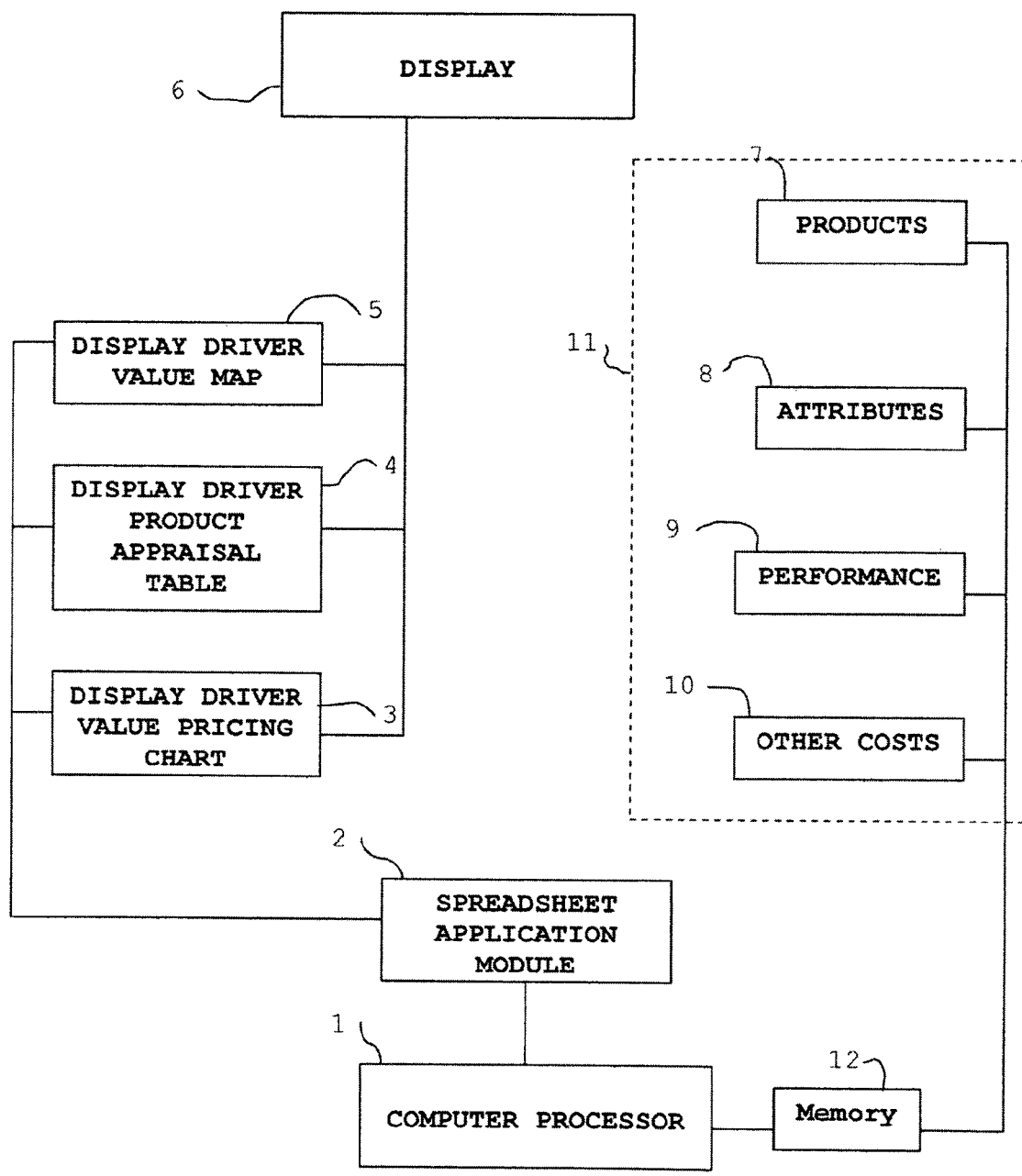
FIG. 1 is a block diagram of a computer system adapted to execute the method of this application.

Referring to FIG. 1 a system is illustrated that can be used to practice aspects of the disclosed embodiments. Although aspects of the invention will be described with reference to what is shown in the drawings and described below, it should be understood that these aspects and embodiments could be arranged in many alternate forms. In addition, any suitable size, shape or type of elements or materials could be used.

To accomplish the features described above, a computer system is provided comprising a processor 1 into which data may be entered by means of a user interface, such as a keyboard (not shown). The processor 1 operates in cooperation with a memory in which is established a database 11. Processor 1 operates to organize, structure, and analyze the data in database 11 according to an application program 2, which in the preferred embodiment is a spreadsheet type application program, such as, Microsoft Excel. Application program 2 is adapted to provide a series of predetermined analytical functions that convert the information in database 11 to a form in which a price can be established for the target product, taking into account customer perceived value. The new structure of the data is represented in unique graphic displays 3-5 as a result of the processing of the data according to the embodiments of this application.

Database 11 is constructed by entering a first list 7 of a group of products that compete in the particular market of a target product, list 7 includes a current price for each product in the list. Such information is generally readily available in market related publications, advertising, catalogs and the like. The database 11 is further established by entering a second list 8 identifying the product attributes that influence a purchase decision. List 8 also includes a weighting factor for each attribute, indicative of the relative influence of the attribute in the decision to purchase a product. Further data is added to database 11 in the form of a performance segment 9 that contains ratings or scores for the target product and each of the competing products relative to each of the identified attributes. Such information, may be obtained projected from consumer publications that report on products, for example, Consumer Reports. A further segment 10 of database 11 contains data identifying the relative costs or benefits resulting from the use of each product. This type of information may also be obtained from published product directed articles.

Application module 2 is preferably a spreadsheet application program, such as Microsoft Excel or other database manipulating application program, and is operatively associated with the processor 1 to provide the framework for processing and organizing the database.

Figure 4:
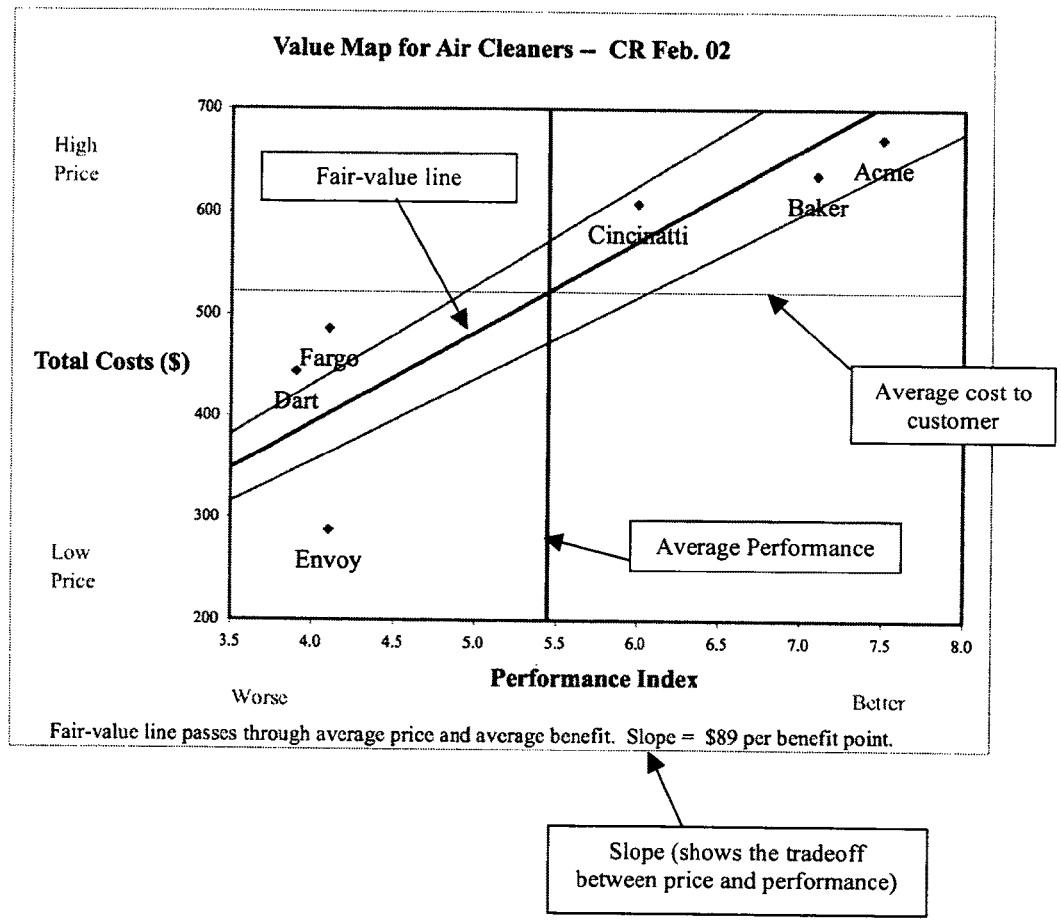
FIG. 4 shows an example of a Value Map adapted for presenting data in accordance with the prior art.

A display 6 is provided to present image screens according to instructions from display drivers 3-5 in response to commands from the application program 2. The application program 2 is adapted to compile elements of the data and calculate certain key factors, such as overall performance scores, average performance scores, and total cost, in order to generate graphic images presenting the processed data in the form of a Value Map, as shown in FIG. 4. The Value Map is a scatter plot of total cost to the customer versus overall performance of each product. A Fair-Value Line may be derived from the Value Map. This line is defined as passing through the point representing the category-average (weighted or unweighted) performance and category-average cost. The slope of the line may be set by the user (based on market research or judgment) or set by an algorithm based on the scatter of points on the Value Map. The slope of the fair-value line may be interpreted as the increase in a product's worth that would be associated with a one-point increase in overall performance. The Value Map may be presented on display 6 through the operation of Value Map display driver 5

Figure 5:
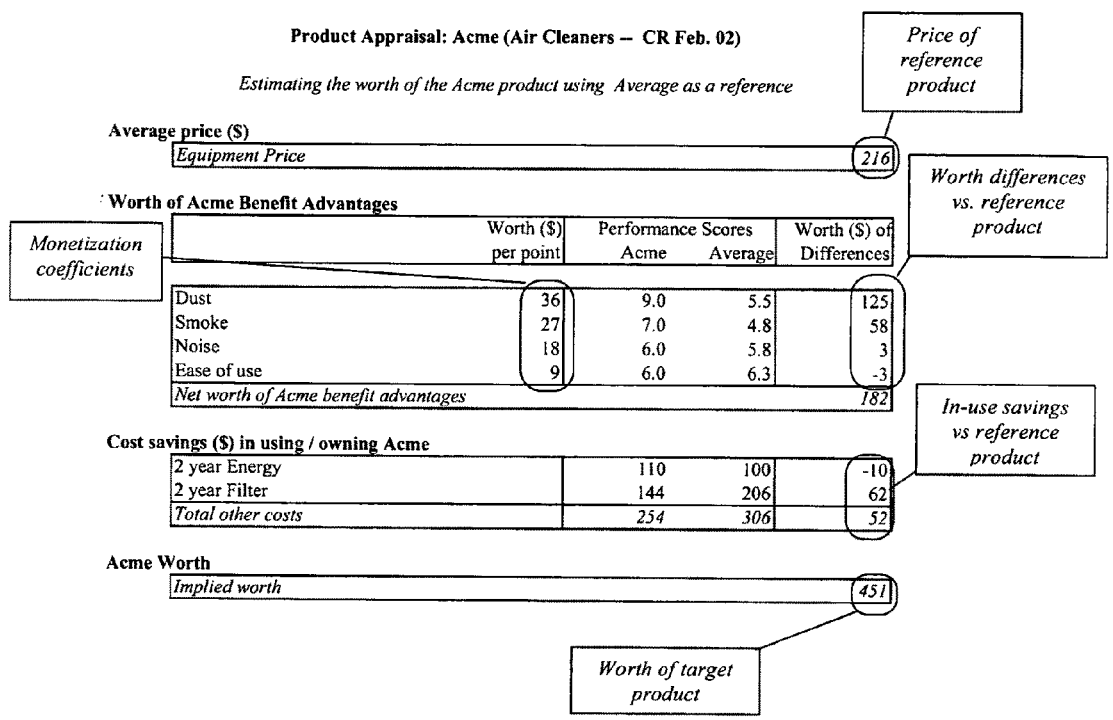
FIG. 5 shows an example of a Product Appraisal Table for presenting data in accordance with the disclosed embodiments.

As a result of the further processing and analysis performed on the data a Product Appraisal Table, as shown in FIG. 5, may be generated that presents all of the data needed to establish a worth of the target product in the market place, based on consumer perceived value. The Product Appraisal Table is a numeric representation of the calculations made during the analysis performed according to the embodiments of this application and may be presented on the display 6 through product appraisal display driver 4.

Figure 6:
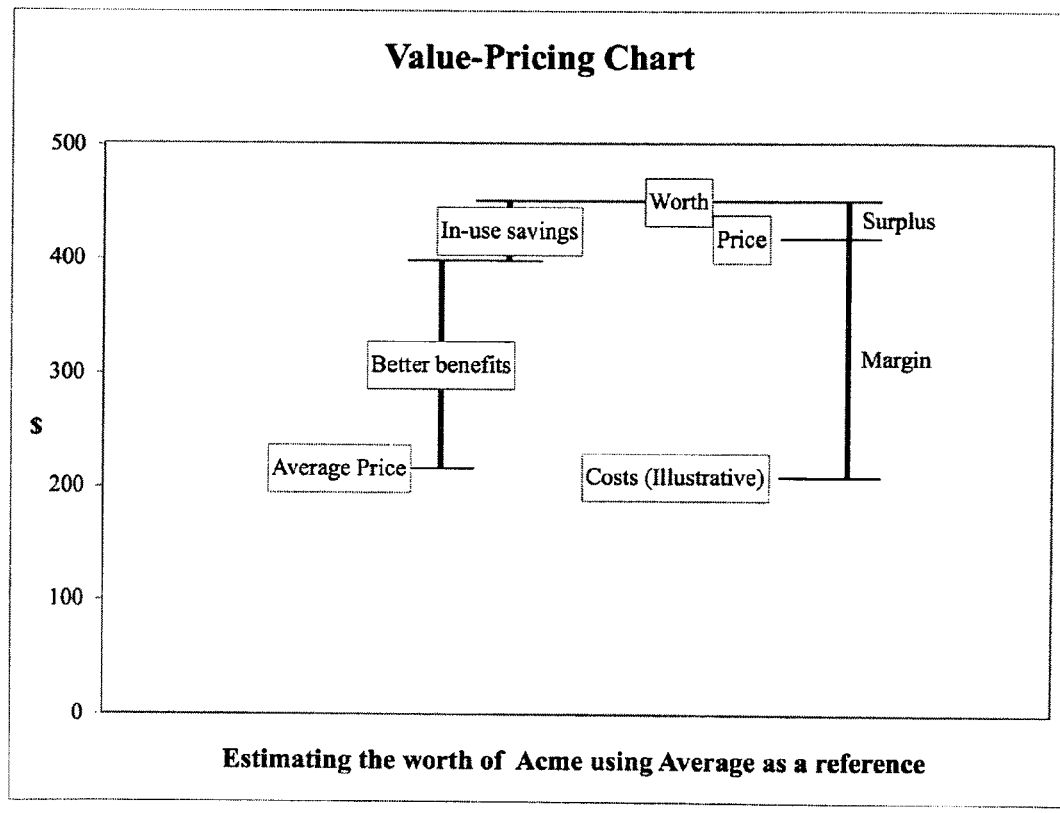
FIG. 6 shows an example of a Value-Pricing Chart for presenting data in accordance with the disclosed embodiments.
Figure 7:
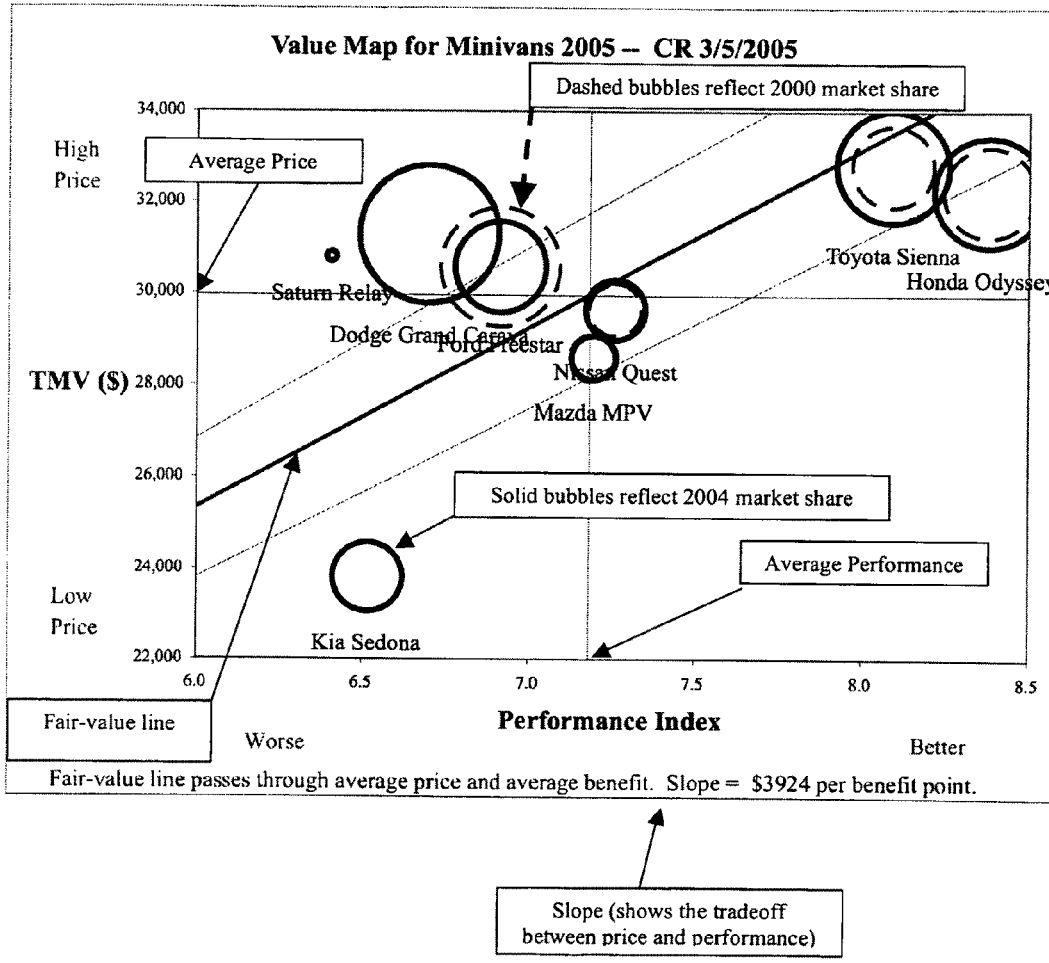
FIG. 7 shows an example of a Value Map having data presented using nested bubbles, according to an alternate embodiment.

To facilitate the setting of a price based on the worth as presented in the Product Appraisal Table, a further graphic image, as shown in FIG. 6, is generated in the form of a Value Pricing Chart. The Value Pricing Chart is a graphical representation of the data presented in the Product Appraisal Table, but also includes a visual resource for setting the price of the target product based on the worth using commonly used additional factors, such as unit production costs, margin and other cost contributing elements. The Value Pricing Chart is presented on display 6 by the execution of value pricing display driver 3/

The processor 1, the databases 7-10, the application module 2, and the display drivers 3-5 may be implemented in many different configurations, on individual servers or conventional personal computers. The databases 7-10 may be implemented in completely separate storage mediums or in a common storage medium using individual or common applications.

The processor 1 may present the resulting information in graphs, charts, or other formats. However, the basic categories of information, as shown in the figures, is preferred, in order to allow interactive analysis using the graphic images.

The flow chart of FIG. 9 shows the functionality and operation of a preferred embodiment in more detail. In this regard, some of the blocks of the flow chart may represent a module segment or portion of code of a program, which comprises one or more executable instructions for implementing the specified logical function or functions. In some alternative implementations, the functions noted in the various blocks may occur out of the order depicted. For example, two blocks shown in succession may in fact be executed substantially concurrently, or the blocks may sometimes be executed in the reverse order depending upon the functionality involved.

Figure 3:
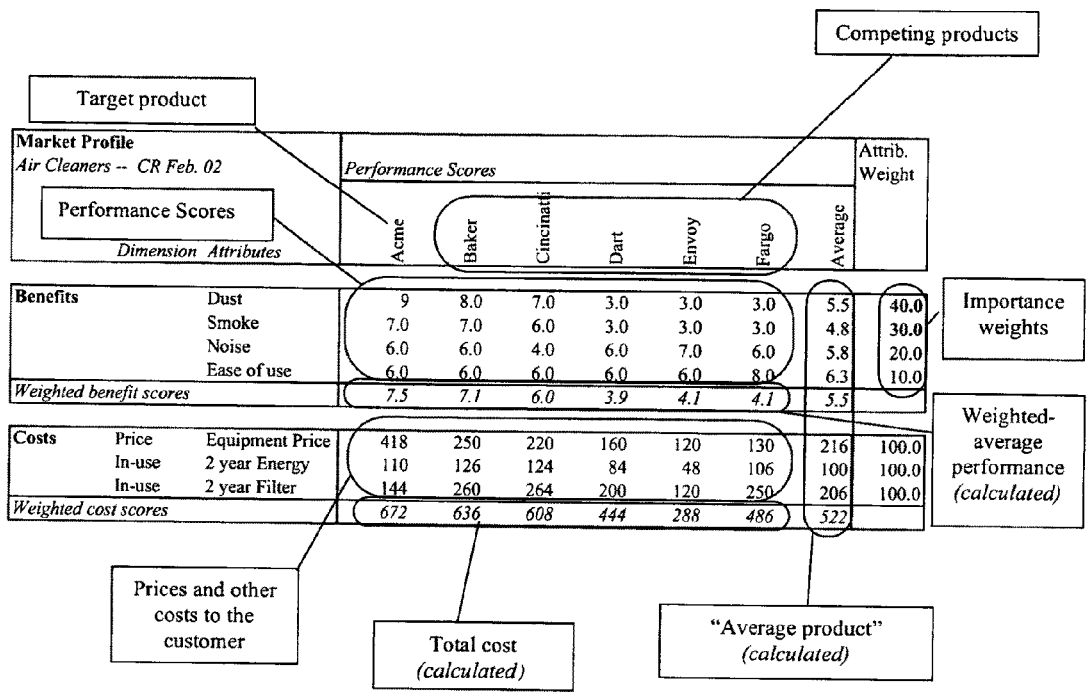
FIG. 3 shows an example of an image for display in which the data used in the disclosed embodiments may be presented.

According to the method of this application, an embodiment of which is illustrated in the flow diagram of FIG. 9, a user of the above system is able to establish a price for a target product based on its value to the customer. After selecting a target product, the user establishes a database containing data relating to the market into which the target product is sold. This is stored in memory 12 associated with processor 1 (100). To accomplish this, the user provides a list of the products that compete with the target product. For each product, the user supplies a current price (101). The user also identifies the market factors, referred to as attributes, that are instrumental in influencing which of the products in the target market a customer will buy (102). Through market surveys, customer evaluation testing, or published data (such as available from Consumer Reports and other periodicals), the relative importance of the identified attributes in the purchase process can be estimated and quantified as a weight factor for each of the attributes (103). Also, using published or otherwise acquired data, each of the products listed in 101 are given a performance score relative to each of the attributes (104). The user may also evaluate the customers' costs (other than the purchase price) associated with using or owning each of the products (106). This information is entered into database 11 for each product. In this manner database 11 is prepared and entered into memory 12 for processing by processor 1. The entry of this data may be conveniently accomplished by the use of a data entry form, such as illustrated in FIG. 2. The accumulated data for a particular market segment may be organized and presented in tabular form, as shown in FIG. 3. The data compiled in the Performance Profile Table of FIG. 3 may be advantageously used to obtain the Value Map of FIG. 4.

From the entered data, the overall product performance for each product and the total cost for each product is calculated (110-111). These data are then used to generate a Value Map (112), as illustrated in FIG. 4. The value map is a plot of overall performance versus total cost for each of the products in the market segment under investigation and provides the medium to generate a Fair-Value line for the market segment (113).

Monetary coefficients are calculated as the worth associated with a one-point improvement in the performance score on each individual attribute (120). These may be calculated as the slope of the fair-value line multiplied by the Attribute's relative importance weight. Utilizing these data, a reference product (typically, the "average product"), is selected (121).

The reference product selected at (121) may be the product that has category-average scores on each attribute and category-average price. The price of the reference product is used as a baseline for estimating the worth of the target product. If the target product offers better overall performance than the reference product, it will be worth more than the reference price. If it is worse, then the price should be less.

The performance scores of the target product are compared against those of the reference product (123), attribute by attribute, and assigned a monetary value based on the monetary coefficient. The monetary value is the worth of a one-point improvement (calculated in step 120) multiplied by the difference in scores between the target product and the reference product.

A product appraisal table may be generated with this information (122) to provide a visual mechanism for comparing the target product, Acme, as shown in FIG. 5, to the reference product (123). This comparison is further illustrated in the Value Pricing Chart of FIG. 6, which provides a graphic visualization of the worth of the product (125) and the final process of setting a price (126) of the method of this application, using the estimated product worth as a benchmark. The worth of the Target product is calculated as the price of the reference product, plus the net monetary value of any performance differences, plus the net value of any savings in the costs of use or ownership.

In alternate embodiment of the method of this application, the individual product plots of the Value Map of FIG. 4, may be represented by circles or bubbles. Traditionally, a point plotted is represented, i.e. products in this case, as dots on the chart. This is a one dimensional representation defined only by the coordinates of the dot relative to the graph. By using bubble plots, further information may be represented. For example, in a Value Map, plotted using bubbles, the bubble sizes may be used to represent the sales of the products. Larger bubbles thereby identify products with larger market shares. In this embodiment, nested bubbles may be used, i.e circles within circles, or dotted lines v solid. By adapting each bubble, historic or chronological data can be added to the display.

Figure 8:
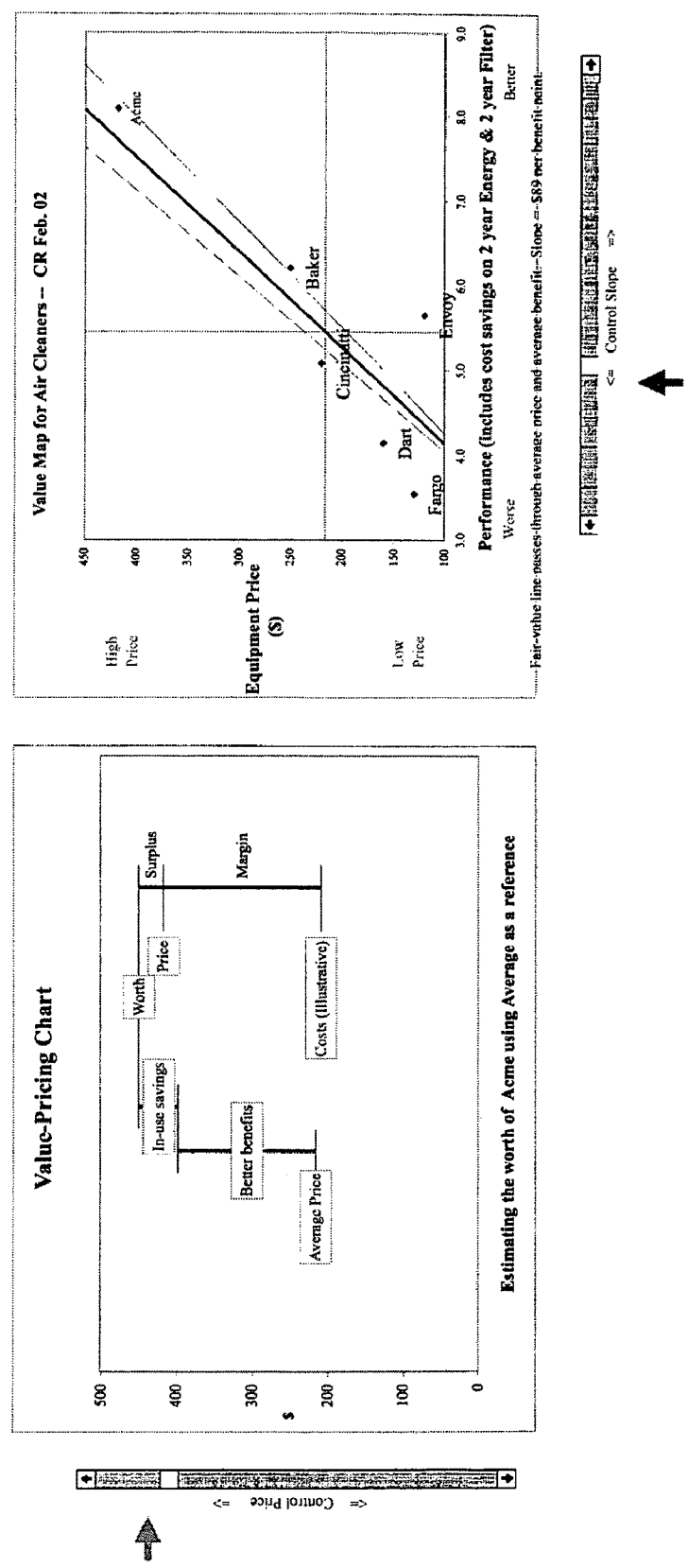
FIG. 8 shows an example of a price simulator display according to an alternate embodiment.

In another embodiment of the method of this application, the Value Map and the Value-Pricing Chart are presented as adjacent parts of a single display referred to as the Pricing Simulator. The display drivers for the adjacent map and chart are adapted to cooperate so that adjustment of, for example, the price of a product under consideration in the Value Pricing Chart results in a corresponding adjustment in the price in the Value Map. In this manner, different strategies may be explored with instantaneously viewable results. Another factor that is advantageous to adjust would be the slope of the Fair-Value Line. For convenient adjustment of these factors in this embodiment, image controls, such as slide controls 20 and 21, as shown in FIG. 8 are presented on the display and are adapted to be moved, for example, by cursor engagement. Movement of the slide control 20 up or down or slide control 21 left or right, changes the positioning of the target product's price or the slope of the Fair-Value Line up or down on the charts in parallel.

In a further embodiment of the system and method of this application, a program is adapted to compile and analyze the data entered in database 11. The program may consist of a processor usable medium such as memory 12 in which code is imbedded for execution by processor 1. The program may be constructed as templates within application module 2 or as a separate program stored in memory 12. Using database 11, the program causes the processor 1 to calculate an overall performance score for each product and the total cost to the customer (purchase price plus other costs or benefits) for each product and generate a scatter plot of total cost to the customer versus overall performance. With the calculated data, the program causes display driver 5 to generate a Value Map as illustrated in FIG. 4 and a "Fair-Value Line" that is adapted to represent the relationship between cost to the customer and performance. The program then causes processor 1 to calculate monetary coefficients, i.e., the worth associated with a one-point improvement in the performance score on each individual attribute. Processor 1 is then caused to select a reference product (typically, the "average product"). The price of the reference product is used as a baseline for estimating the worth of the business's product. The program then causes processor 1 to compare the performance scores of the target product against the reference product, attribute by attribute, and assign a monetary value to the differences. The monetary value is the worth of a one-point improvement multiplied by the difference in scores between the target product and the reference product. With this information, the program may generate a Product Appraisal Table, as illustrated in FIG. 5. Using the information processed to obtain the Product Appraisal Table the program causes the processor 1 to estimate a worth to the customer for the target product and generate a Value-Pricing Chart, as shown in FIG. 6, using the data presented in the Value-Pricing Chart, competitive price for the target product may be set.

In a further embodiment of the program, the program is adapted to cause display driver 5 to generate a Value Map using nested bubbles to identify market share by the size of the bubble and historic market share by bubbles within bubbles.

In a further embodiment of the program, the program is adapted to cause display drivers 3 and 5 to generate a Price Simulator display that combines the presentation of data in a Value Pricing Chart adjacent to a Value Map in which product price and Fair-Value Line may be adjusted by the manipulation of a control image.

It should be understood that the above description is only illustrative of the embodiments of this application. It is important to note that various alternatives and modifications can be devised by those skilled in the art without departing from the scope of this application. Accordingly, the disclosed embodiments are intended to embrace all such alternatives, modifications and variances that fall within the scope of the appended claims.

What is claimed is:

1. A method for establishing a price for a target product comprising:
    compiling and storing, by a computer, a listing of products that compete in a market for the target product;
    identifying and storing, by the computer, a listing of attributes that influence a purchase decision with respect to the target product and the products in the listing of products;
    establishing, by the computer, a weighting factor indicative of the influence of each attribute in the purchase decision;
    establishing, by the computer, a performance score for each weighted attribute for the target product and the products in the listing of products;
    compiling and storing, by the computer, purchase prices for the target product and the products in the listing of products;
    compiling and storing, by the computer, cost and benefit data in monetary value for the target product and the products in the listing of products;
    using the computer, calculating monetization coefficients, representing a worth associated with an incremental improvement in a performance score on each individual attribute;
    selecting, by the computer, a reference product;
    comparing, by the computer, the performance scores of the target product against the performance scores of the reference product, and calculating a difference value for each attribute; using the monetization coefficients, calculate a monetary value for the difference values;
    calculating an estimate, by the computer, of the worth of the target product from the price of the reference product, the net monetary value of any monetary difference values, and the net monetary value of the cost and benefit data; and
    using the estimated worth, by the computer, select a price for the target product for strategically positioning the target product in the market;
    establishing, by the computer, an average product having an average performance score on each attribute of the target product and the products in the listing of products and an average price of the target product and the products in the listing of products, and using the average product as the reference product.

2. The method according to claim 1 further comprising presenting on a display a value map comprising a graph of the price of the target product and the products in the listing of products versus the performance scores of the target product and the products in the listing of products.

3. The method according to claim 2, further wherein individual plots on the graph are represented by circles the size of which is scaled to represent market share.

4. The method according to claim 2, further wherein individual plots on the graph are represented by circles within circles the relative position of which is indicative of chronological order.

5. The method according to claim 1 further comprising presenting a composite price simulator display wherein the price simulator display comprises side by side presentations of: a first display having a first tabular tree presenting the price of the reference product, a summarized value of the monetary value for the difference values, the net monetary value of the cost and benefit data, and a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product; and a second display comprising a graph of the price of the target product and the products in the listing of products versus the performance scores for the target product and the products in the listing of products; and wherein a factor on either of the displays may be adjusted by a user and wherein an adjustment of a parameter on one of said displays results in a corresponding adjustment of the parameters on the other display.

6. The method of claim 5 wherein image controls are displayed for engagement by the user to provide a graphic device by which adjustment of a factor may be accomplished.

7. The method according to claim 1 further comprising presenting on a display a tabular representation of the reference price, the monetization coefficients for each attribute, the performance scores for the target product and the reference product, the monetary value for the difference values, monetary value of the cost and benefit data, and the estimated worth.

8. The method according to claim 1 further comprising presenting on a display a first tabular tree presenting the price of the reference product, a summarized value of the monetary value for the difference values, the net monetary value of the cost and benefit data, and a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product.

9. A system for establishing a price for a target product comprising:
    a computer processor in operative association with a memory and a display; a database compiled and stored in said memory, said data base further comprising:
    a listing of products that compete in a market for the target product;
    a listing of attributes that influence a purchase decision with respect to the target product and the products in the listing of products said attributes being weighted according to a factor indicative of the influence of each attribute in the purchase decision;

a performance score for each weighted attribute for the target product and the products in the listing of products;
purchase prices for the target product and the products in the listing of products;
cost and benefit data in monetary value for the target product and the products in the listing of products;
wherein the computer processor further comprises an application processor module, said application processor module adapted to:
calculate monetization coefficients, representing a worth associated with an incremental improvement in a performance score on each individual attribute;
select a reference product;
compare the performance scores of the target product against the performance scores of the reference product, and calculate a difference value for each attribute;
using the monetization coefficients, calculate a monetary value for the difference values; calculate an estimate of the worth of the target product from the price of the reference product, the net monetary value of any monetary difference values, and the net monetary value of the cost and benefit data; and
using the estimated worth, allow selection of a price for the target product for strategically positioning the target product in the market;
establish an average product having an average performance score on each attribute of the target product and the products in the listing of products and an average price of the target product and the products in the listing of products, and to use the average product as the reference product.

10. The system according to claim 9 wherein the application processor module further comprises a value map display driver adapted to present on the display a value map comprising a graph of the price of the target product and the products in the listing of products versus the performance scores of the target product and the products in the listing of products.

11. The system according to claim 10, wherein the value map driver is adapted to present individual plots on the graph as circles the size of which is scaled to represent market share.

12. The system according to claim 10, wherein the value map driver is adapted to present individual plots on the graph as circles within circles the relative position of which is indicative of chronological order.

13. The system according to claim 9 further comprising a composite price simulator display driver wherein the price simulator display driver is adapted to cause the side by side presentation of: a first display having a first tabular tree presenting the price of the reference product, a summarized value of the monetary value for the difference values, the net monetary value of the cost and benefit data, and a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product; and a second display comprising a graph of the price of the target product and the products in the listing of products versus the performance scores for the target product and the products in the listing of products; and wherein a factor on either of the displays may be adjusted by a user and wherein an adjustment of a parameter on one of said displays results in a corresponding adjustment of the parameters on the other display.

14. The system of claim 13 wherein the price simulator driver is adapted to present on the display image controls for engagement by the user to provide a graphic device by which adjustment of a factor may be accomplished.

15. The system according to claim 9 wherein the application processor module further comprises a product appraisal display driver adapted to present on the display a tabular representation of the reference price, the monetization coefficients for each attribute, the performance scores for the target product and the reference product, the monetary value for the difference values, the monetary value of the cost and benefit data, and the estimated worth.

16. The system according to claim 9 wherein the application processor module further comprises a value pricing display driver adapted to present on the display a first tabular tree presenting the price of the reference product, a summarized value of the monetary value for the difference values, the net monetary value of the cost and benefit data, and a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product.

17. A non-transitory processor usable medium having processor readable program code embodied therein for executing an application for establishing a price for a target product, the processor readable program code comprising:
processor readable program code for causing a processor to compile and store a listing of products that compete in a market for the target product;
processor readable program code for causing a processor to identify and store a listing of attributes that influence a purchase decision with respect to the target product and the products in the listing of products;
processor readable program code for causing a processor to establish a weighting factor indicative of the influence of each attribute in the purchase decision;
processor readable program code for causing a processor to establish a performance score for each weighted attribute for the target product and the products in the listing of products;
processor readable program code for causing a processor to compile and store purchase prices for the target product and the products in the listing of products;
processor readable program code for causing a processor to compile and store cost and benefit data in monetary value for the target product and the products in the listing of products;
processor readable program code for causing a processor to calculate monetization coefficients, representing a worth associated with an incremental improvement in a performance score on each individual attribute;
processor readable program code for causing a processor to select a reference product;
processor readable program code for causing a processor to compare the performance scores of the target product against the performance scores of the reference product, and calculate a difference value for each attribute;
processor readable program code for causing a processor to, using the monetization coefficients, calculate a monetary value for the difference values;
processor readable program code for causing a processor to calculate an estimate of the worth of the target product from the price of the reference product, the net monetary value of any monetary difference values, and the net monetary value of the cost and benefit data; and processor readable program code for causing a processor to, using the estimated worth, allow selection of a price for the target product for strategically positioning the target product in the market;

processor readable program code for causing a processor to establish an average product having an average performance score on each attribute of the target product and the products in the listing of products and an average price of the target product and the products in the listing of products, and to use the average product as the reference product.

18. The processor usable medium according to claim 17 further comprising processor readable program code for causing a processor to present on a display a value map comprising a graph of the price of the target product and the products in the listing of products versus the performance scores of the target product and the products in the listing of products.

19. The processor usable medium according to claim 18 wherein individual plots on the graph are represented by circles the size of which is scaled to represent market share.

20. The processor usable medium according to claim 18 wherein individual plots on the graph are represented by circles within circles the relative position of which is indicative of chronological order.

21. The processor usable medium according to claim 17 further comprising processor readable program code for causing a processor to present a composite price simulator display wherein the price simulator display comprises side by side presentations of: a first display having a first tabular tree presenting the price of the reference product, a summarized value of the monetary value for the difference values, the net monetary value of the cost and benefit data, and a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product; and a second display comprising a graph of the price of the target product and the products in the listing of products versus the performance scores for the target product and the products in the listing of products; and wherein a factor on either of the displays may be adjusted by a user and wherein an adjustment of a parameter on one of said displays results in a corresponding adjustment of the parameters on the other display.

22. The processor usable medium according to claim 17 further comprising processor readable program code for causing a processor to present image controls for engagement by the user to provide a graphic device by which adjustment of a factor may be accomplished.

23. The processor usable medium according to claim 17 further comprising processor readable program code for causing a processor to present on a display a tabular representation of the reference price, the monetization coefficients for each attribute, the performance scores for the target product and the reference product, the monetary value for the difference values, monetary value of the cost and benefit data, and the estimated worth.

24. The processor usable medium according to claim 17 further comprising processor readable program code for causing a processor to present on a display a first tabular tree presenting the price of the reference product, a summarized value of the monetary value for the difference values, the net monetary value of the cost and benefit data, and, a summary value of values in the first tabular tree representing the worth of the target product, and a second tabular tree presenting a unit cost of production for the target product, a margin value for the target product, and a price for the target product, wherein said first and second tabular trees are positioned to allow a viewer to observe the relationship of the established price of the target product to worth of the target product.

* * * * *